(12) United States Patent
Li

(10) Patent No.: US 10,423,776 B1
(45) Date of Patent: Sep. 24, 2019

(54) SYSTEMS AND METHODS FOR PASSWORD-BASED AUTHENTICATION

(71) Applicant: Pepperword Inc., Fremont, CA (US)

(72) Inventor: Zhiwei Li, Fremont, CA (US)

(*) Notice: Subject to any disclaimer, the term of this patent is extended or adjusted under 35 U.S.C. 154(b) by 161 days.

(21) Appl. No.: 15/182,570

(22) Filed: Jun. 14, 2016

Related U.S. Application Data

(60) Provisional application No. 62/175,340, filed on Jun. 14, 2015.

(51) Int. Cl.
| | |
|---|---|
| *G06F 21/31* | (2013.01) |
| *G06F 21/46* | (2013.01) |
| *H04L 9/32* | (2006.01) |
| *H04L 29/06* | (2006.01) |

(52) U.S. Cl.
CPC ............ *G06F 21/46* (2013.01); *G06F 21/31* (2013.01); *H04L 9/3236* (2013.01); *H04L 63/083* (2013.01); *H04L 63/10* (2013.01)

(58) Field of Classification Search
USPC ........ 713/182, 150, 163, 181; 726/2, 21, 36; 380/255, 264, 276
See application file for complete search history.

(56) References Cited

U.S. PATENT DOCUMENTS

| | | | |
|---|---|---|---|
| 2007/0157298 A1* | 7/2007 | Dingwall | G06F 21/34 726/8 |
| 2008/0046984 A1* | 2/2008 | Bohmer | H04L 63/0853 726/5 |
| 2013/0198510 A1* | 8/2013 | Rahman | H04L 9/321 713/155 |
| 2015/0089221 A1* | 3/2015 | Taylor | H04W 12/08 713/168 |
| 2015/0222619 A1* | 8/2015 | Hughes | H04L 63/08 713/168 |
| 2016/0269393 A1* | 9/2016 | Corella | H04L 63/083 |
| 2017/0048215 A1* | 2/2017 | Straub | G06Q 30/0603 |

* cited by examiner

*Primary Examiner* — Sharif E Ullah
(74) *Attorney, Agent, or Firm* — Zheng "Andy" Liu

(57) ABSTRACT

Systems and methods for password-based authentication are described. A password hardening method may include a step of receiving input provided by a user, wherein the user-provided input includes a password provided by the user for an application, and wherein at least a portion of the application is protected by a password-based authentication service. The method may also include a step of obtaining a hardened password for the user for the application, wherein the hardened password is based, at least in part, on the user-provided password, identification data associated with the application, and at least a portion of an entropy datastore associated with the user. The method may also include a step of providing the hardened password to the password-based authentication service, wherein the authentication service grants the user access to the password-protected portion of the application based, at least in part, on the provided hardened password.

15 Claims, 6 Drawing Sheets

SYSTEMS AND METHODS FOR PASSWORD-BASED AUTHENTICATION

CROSS-REFERENCE TO RELATED APPLICATION

This application claims the benefit under 35 U.S.C. § 119(e) of U.S. Provisional Patent Application No. 62/175,340 titled "Systems and Methods for Leveraging User-Provided Entropy to Enhance Password-Based Authentication" and filed on Jun. 14, 2015, which is hereby incorporated by reference herein in its entirety.

FIELD OF THE DISCLOSURE

The present disclosure relates generally to authentication systems. Some embodiments relate specifically to systems and methods that make it easier for users to create and use strong passwords.

BACKGROUND

Password-based authentication remains a ubiquitous authentication method. In password-based authentication systems, two entities (e.g., a user and a service provider) share a password in advance and use the password as the basis for authentication. In many password-based authentication systems, a user's security credentials include not only a password but also a user identifier (user ID). To obtain access to password-protected data and/or services, a user presents a valid user ID and the corresponding password. After authenticating the security credentials provided by the user, the service provider grants the user access to the protected services.

SUMMARY OF THE INVENTION

One significant concern with password-based authentication is the cognitive burden of choosing and remembering secure, difficult-to-guess passwords for different applications. Many users are unable or unwilling to maintain different strong passwords for different applications. Although alternative schemes have been proposed (e.g., password management tools, biometric authentication techniques, etc.), none of these schemes are sufficiently usable, secure, and deployable in practice to replace passwords. Users, therefore, have—possibly, rationally—continued to use weak passwords across different applications, despite the significant risk of massive password breaches. The use of weak, or low-entropy, passwords can lead to many types of security attacks, ranging from password cracking attacks to password reuse attacks, in addition to traditional phishing and key logging attacks.

In view of the above, there exists a need for a tool that reduces the burden associated with using high entropy passwords. The inventor has recognized and appreciated that the burden associated with using high entropy passwords can be reduced by providing a tool that leverages user provided entropy to convert user-provided passwords into strong, application-specific passwords without requiring the user to learn the strong passwords. For example, the user can provide a source of information entropy (e.g., a video, an image, or other data) to the tool. When the user provides a password to the user interface of an application (e.g., when creating the user's password or when providing the password to gain access to the password-protected portions of the application), the tool can (1) intercept the user-provided password, (2) generate data identifying the application, (3) use the user-provided password, the data identifying the application, and the source of information entropy to deterministically generate a strong password, and (4) provide the strong password to the application in place of the user-provided password. In this way, the tool can provide strong, application-specific passwords, even when the user provides weak passwords.

According to an aspect of the present disclosure, a password hardening method is provided, including: receiving input provided by a user, wherein the user-provided input includes a password provided by the user for an application, and wherein at least a portion of the application is protected by a password-based authentication service; obtaining a hardened password for the user for the application, wherein the hardened password is based, at least in part, on the user-provided password, identification data associated with the application, and at least a portion of an entropy datastore associated with the user; and providing the hardened password to the password-based authentication service, wherein the authentication service grants the user access to the password-protected portion of the application based, at least in part, on the provided hardened password.

According to another aspect of the present disclosure, a password hardening system is provided, including one or more computers programmed to perform operations including: receiving input provided by a user, wherein the user-provided input includes a password provided by the user for an application, and wherein at least a portion of the application is protected by a password-based authentication service; obtaining a hardened password for the user for the application, wherein the hardened password is based, at least in part, on the user-provided password, identification data associated with the application, and at least a portion of an entropy datastore associated with the user; and providing the hardened password to the password-based authentication service, wherein the authentication service grants the user access to the password-protected portion of the application based, at least in part, on the provided hardened password.

Other aspects and advantages of the invention will become apparent from the following drawings, detailed description, and claims, all of which illustrate the principles of the invention, by way of example only. The foregoing summary, including the description of motivations for some embodiments and/or advantages of some embodiments, is intended to assist the reader in understanding the present disclosure, and does not in any way limit the scope of any of the claims.

BRIEF DESCRIPTION OF THE DRAWINGS

Various embodiments of the present disclosure may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

DETAILED DESCRIPTION

Figure 1:
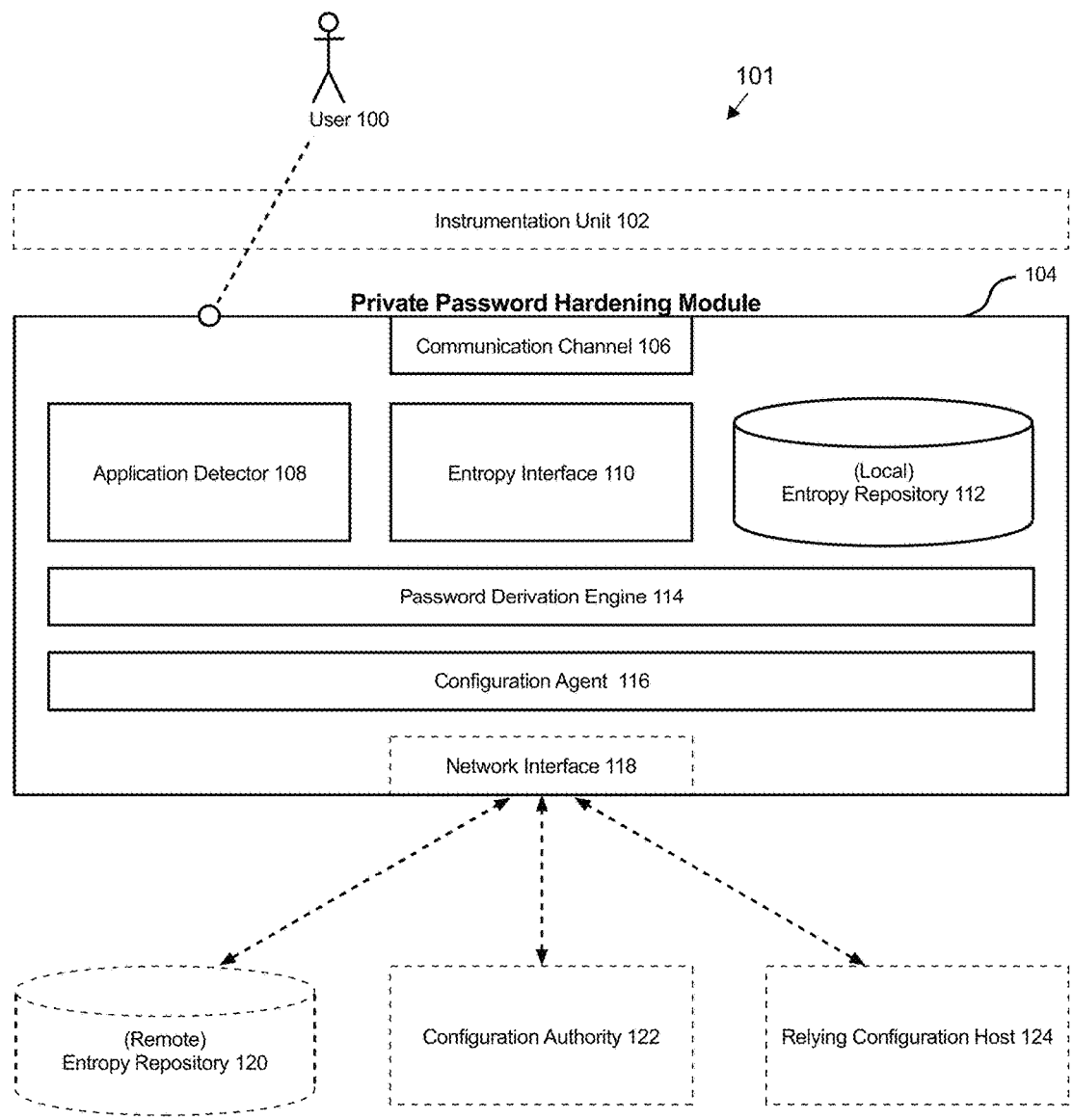
FIG. 1 is a block diagram illustrating a security system, according to some embodiments.

In the following description, for the purposes of explanation, numerous specific details are set forth to provide a thorough understanding of some embodiments of systems and methods for password-based authentication. It will be apparent, however, that some embodiments may be practiced without these specific details. In other instances, well-known structures and devices are shown in block diagram form to avoid unnecessarily obscuring features of some embodiments.

Methods, systems, and articles of manufacture consistent with features of the present invention, as embodied and broadly described herein, can overcome the shortcomings of traditional password-based authentication systems by allowing the generation and use of hardened passwords ("HPs") in a password-based authentication system by leveraging user-provided entropy. Some embodiments provide a development tool that derives strong HPs from original user-provided passwords ("UPPs") and the user-provided entropy.

Among many benefits, some methods, systems, and articles of manufacture consistent with the present invention can empower a user to create strong passwords (HPs) without burdening the user to memorize the strong passwords. Some embodiments generate application-specific HPs with high entropy and hence enhance protection against traditional password-related attacks, including but not limited to, phishing, password cracking, and password reuse attacks. In other words, some methods, systems, and articles of manufacture consistent with the present invention, as embodied and broadly described herein, can allow a user to use and reuse weak password(s) without endangering security.

Reference will now be made in detail to implementations of some embodiments, examples of which are illustrated in the accompanying drawings. Wherever possible, the same reference numbers are used throughout the drawings to refer to the same or like parts.

The above-noted features and other aspects and principles of the present invention may be implemented in various environments. Such environments and related applications may be specially constructed for performing the various processes and operations of some embodiments or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. Thus, the present invention is not limited to the embodiments shown, but is to be accorded the widest scope consistent with the principles and features disclosed herein.

1. Terms

As used herein, a "user-provided password" ("UPP") is a sequence of characters provided (e.g., typed) by a user for authentication (directly or indirectly). A user may provide a UPP, for example, in a password input field of a user interface. As UPPs are provided (e.g., manually typed) by a user (at least initially, before the application has had an opportunity to store the UPP), UPPs often have to be remembered by the user and hence often have low entropy.

As used herein, a "hardened password" ("HP") is a sequence of characters (e.g., an application-specific sequence of characters) derived from a UPP and entropy data (e.g., an application-specific secret). The entropy data (e.g., application-specific secret) may be generated securely with the use of user-provided entropy. Thanks to the user-provided entropy, a HP is often of high entropy and hence suitable for authenticating the user.

In traditional password-based authentication systems, UPPs are typically directly used to authenticate the user. However, in some embodiments described herein, UPPs are used to generate HPs, which are directly used for authentication.

As used herein, an "application" or "app" is a computer program. Some apps (e.g., "web apps", "native apps", and "native services") run on client devices. As used herein, a "web app" is an application that runs within an "Internet browser" or "web browser" (e.g., a mobile or desktop browser). As used herein, a "native app" is an application that runs on a specific hardware platform (desktop or mobile) as a dedicated process. As used herein, a "native service" (or, "service") is an application that runs on a specific hardware platform (desktop or mobile) within the context of another application. In some cases, the lifecycle of a service largely depends on the relying app and is mostly managed by the underlying OS. One example of a service is an input method editor (IME).

As used herein, a "relying app" is an application (or portion thereof) that uses password-based authentication (e.g., an application that uses hardened passwords generated using embodiments of the systems and methods described herein for authentication). In some embodiments, a relying app is a web application ("relying web app") or a native application ("relying native app").

As used herein, an "enabling app" is an application that facilitates the use of hardened passwords by a relying app using embodiments of the systems and methods described herein. In some embodiments, an enabling app directly facilitates the use of HPs by a relying app through integration (e.g., browser extension) with the relying app so that the process of transforming UPPs to HPs is transparent to the end user. In some embodiments, an enabling app indirectly facilitates the use of HPs by a relying app without integrating with the relying app (e.g., a standalone enabling app generates a HP, and the user manually enters the HP into the relying (e.g., by typing the HP or by copying and pasting the HP). Enabling apps that indirectly facilitate the use of HPs by relying apps may be beneficial when integration with the relying app is difficult or infeasible. An enabling app that indirectly facilitates the use of HPs by relying apps but does not directly facilitate use of HPs by relying apps may be referred to herein as a "standalone enabling app". In some embodiments, a user may use a standalone enabling app to view generated HPs on-demand without necessarily engaging in any active authentication session. An enabling app can be a web application ("enabling web app"), a native app ("enabling native app"), or a native service ("enabling service").

As used herein, a "raw identifier" is a piece of information that identifies (e.g., uniquely identifies) a relying app (e.g., a running relying app). In some embodiments, the raw identifier of a relying app may depend on the app's type, attributes of the device running the relying app, etc. For example, a the raw identifier of a relying web app may depend on the relying web app's origin (e.g., uniform resource locator ("URL") or other address), and the raw identifier of a relying native app may depend on the name of a package or executable file associated with the relying native app. In some embodiments, a relying app may have multiple raw identifiers. In some embodiments, a raw identifier may uniquely identify a relying app, thereby facilitating deterministic generation of HPs for relying apps. In some embodiments, the raw identifier of a running relying app may be available on the client device running the relying app.

As used herein, a "target identifier" is a piece of information, which may or may not be the same as a raw identifier, that identifies (e.g., uniquely identifies) a group of related relying app(s) that share the same credentials. A target identifier can take any appropriate form. In some embodiments, a target identifier for a group of related relying web apps may be a URL (e.g., without path, query, and fragment components). For example, https://example.com can be used as a target identifier for a set of relying web applications hosted in the https://example.com domain. In some embodiments, the target identifier of a relying app may not necessarily be available on a client device. In some embodiments, a target identifier may uniquely identify a target server associated with a relying app.

As used herein, the term "entropy source" may refer to any computer readable media that can be used to deterministically generate high-entropy information. Instead of explicitly providing the raw entropy used to strengthen UPPs, a user may provide an entropy source, which may be used to derive HPs from UPPs. Examples of entropy sources include one or more files (e.g., PDF, JPEG, MP3, MOV files, etc.), stored locally or remotely (e.g., in a cloud service), from which entropy can be extracted by a computer.

As used herein, the term "entropy datastore" refers to a data derived from an entropy source that can be used to generate application-specific secrets. The process of transforming an entropy source to an entropy datastore may be computationally efficient or computationally inefficient. A computationally expensive process of transforming an entropy source into an entropy datastore may be acceptable for security reasons, as the use of such a process may discourage and inhibit brute-force attempts to crack HPs. After building the entropy datastore from the entropy source, the entropy source may be removed from the device.

In some embodiments, the strength of the hardened passwords generated using an entropy source may be enhanced if the entropy source is provided by the user. For example, a user may provide an unmodified personal photo as an entropy source, because (a) such a photo may be highly personal and valuable to the user, and hence the user may be less likely to lose it; (b) the use of personalized entropy sources may enhance security as it may be difficult for attackers (but easy for the user) to know which photo was used as the entropy source; and (c) a personal photo may contain fairly rich information (e.g., more than 1 MB).

2. An Exemplary Security System

FIG. 1 illustrates a security system 101, according to some embodiments. In the example of FIG. 1, a user 100 interacts with a Private Password Hardening Module (PPHM) 104, which leverages an entropy source (e.g., a user-provided entropy source) to generate HPs. The security system 101 may or may not include an instrumentation unit 102, a remote entropy datastore 120, a configuration authority 122, or a relying configuration host 124.

In some embodiments, the Private Password Hardening Module (PPHM) 104 operates standalone independent of existing password-based authentication systems. In some embodiments, the PPHM 104 works as a subsystem of an existing password-based authentication infrastructure. The Instrumentation Unit 102 is optional, but may be used in some embodiments to integrate the PPHM 104 with a relying app.

In some embodiments, the Application Detector 108 identifies a relying application to which a credential (e.g., HP) will be submitted (e.g., obtains a raw identifier or target identifier for the relying application).

In some embodiments, the Entropy Interface 110 provides an interface to both the producer of user-provided entropy (e.g., the user 100) and consumer(s) of user-provided entropy (e.g., the Password Derivation Engine 114). In some embodiments, the Entropy Interface 110 may be configured via the Configuration Agent 116. In some embodiments, the Entropy Interface 110 (1) permits a user 100 to choose, delete, load, or update an entropy source, (2) permits a user to initiate the process of converting the entropy source into an entropy datastore, and/or (3) stores an entropy source (e.g., a user-provided entropy source) and/or an entropy datastore in a Local Entropy Repository 112 and/or in a Remote Entropy Repository 120.

In some embodiments, the Password Derivation Engine 114, which may be configured via the Configuration Agent 116, computes a HP based on a UPP provided by the user 100 and an application-specific secret provided by the Entropy Interface 110. For example, the Password Derivation Engine 114 may obtain an identifier (e.g., a target identifier) of a relying app from the Application Detector 108, obtain an application-specific secret for the relying app by providing the identifier to the Entropy Repository (e.g., the Local Entropy Repository 112 or the Remote Entropy Repository 120), and use the UPP and the application-specific secret to compute the HP. The Password Derivation Engine 114 may compute the HP such that (1) for the same UPP, the computed HP differs for different target identifiers and therefore for different relying apps, (2) the UPP is difficult to infer from the HP, and (3) the HP is difficult to infer from the UPP without access to the entropy datastore. For example, the Password Derivation Engine 114 may use a cryptographic secure one-way function to compute a hash value of data representing a UPP (e.g., a string of characters representing the UPP) and an application-specific secret provided by the Entropy Interface 110 for a relying application. In some embodiments, the Password Derivation Engine 114 may use the hash value as the HP. In some embodiments, the Password Derivation Engine 114 may use the hash value to generate the HP in accordance with any password policies imposed by the relying application (e.g., policies relating to the length of the password, characters that cannot be included in the password, combinations of characters that must be included in the password, etc.). In some embodiments, password policy information for a relying app may be provided through the Configuration Agent 116 or obtained from the Application Detector 106.

In some embodiments, the Configuration Agent 116 may collect meta-information of the relying application, with or without help from the user 100, and map the meta-information of the relying application to a raw or target identifier, which may be shared within a group of related relying applications but differ for different relying applications. In some embodiments, the Configuration Agent 116 may include a database, a configuration file, and/or any other structure that stores configurations, settings, preferences, and/or protocols.

In some embodiments, the Network Interface 118, which is optional, allows the PPHM 104 to communicate with external systems. For example, the PPHM 104 may use the Network Interface 118 to communicate with a Remote Entropy Repository 120, a Configuration Authority 122, and/or a Relying Configuration Host 124. (Some embodiments of the Configuration Authority 122 and the Relying Configuration Host 124 are described below.)

3. An Exemplary Password-Hardening Method

Figure 2:
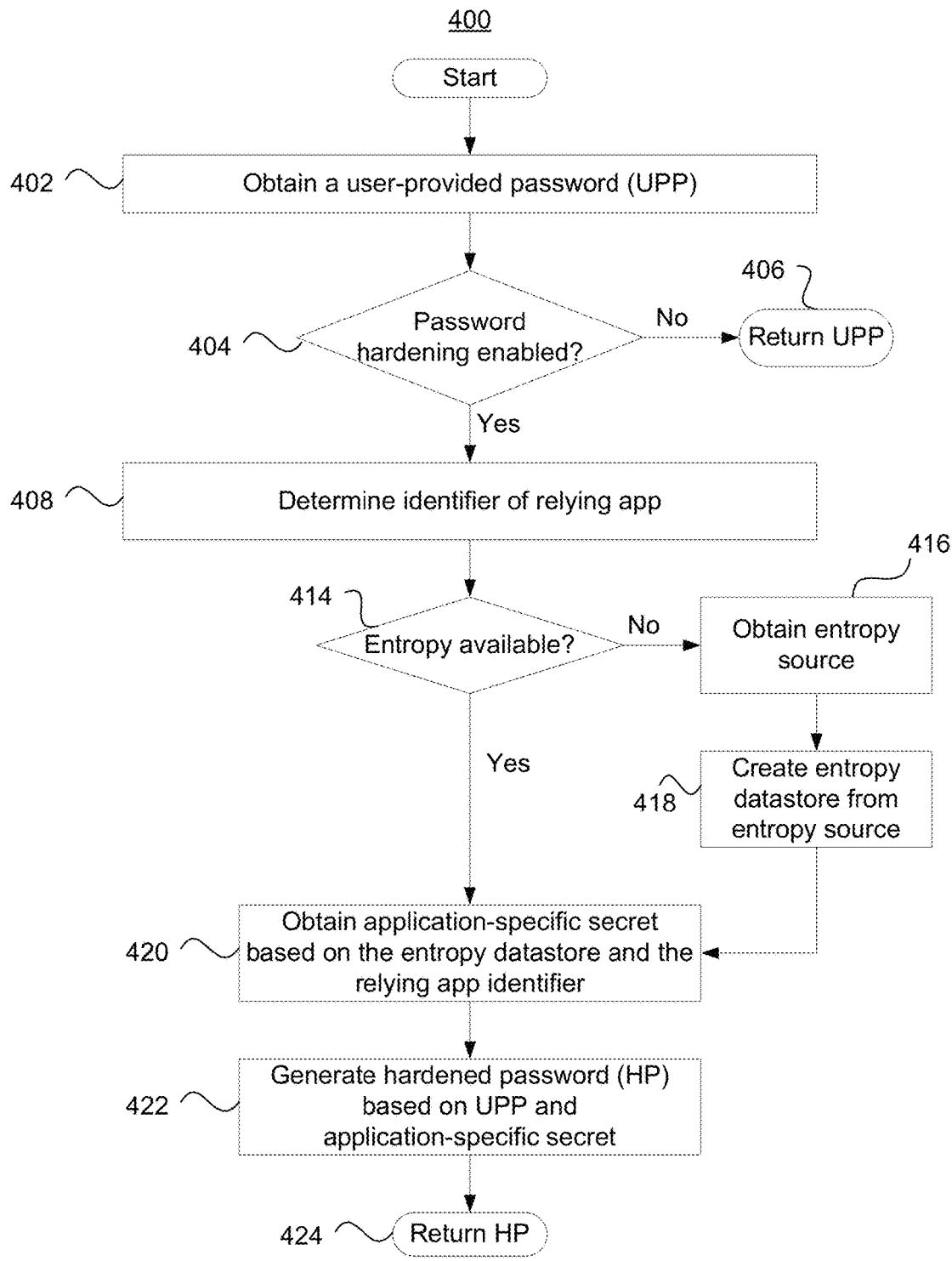
FIG. 2 is a flowchart illustrating a method of generating a hardened password using a user-provided password (UPP), according to some embodiments.

FIG. 2 illustrates a method 400 for generating a hardened password (HP), according to some embodiments. The method 400 may include a step 402 of obtaining a user-provided password (UPP), a step 404 of determining whether password hardening is enabled, and a step 406 of returning the user provided-password if password hardening is not enabled. If password hardening is enabled, then flow of control proceeds to a step 408 of determining an identifier of a relying app. In step 414, the system determines whether suitable entropy is available for generating a hardened password for the user. If not, the system may obtain an entropy source in step 416 and create an entropy datastore from the entropy source in step 418. If a suitable entropy datastore is already available in step 414, or after creating an entropy datastore in step 418, flow of control proceeds to step 420, in which the system obtains an application-specific secret based on the entropy datastore and the identifier of the relying app. In step 422, a hardened password (HP) is generated based, at least in part, on the user-provided password (UPP) and the application-specific secret, and in step 424, the HP is returned.

Some embodiments of steps of the password-hardening method 400 are described in further detail below. Also, some embodiments of the password-hardening method 400 may include all the steps shown in FIG. 2, or fewer than all the steps shown in FIG. 2. For example, some embodiments of the password-hardening method 400 may include steps 402, 408, 420, 422, and 424, and may omit some or all of the other steps illustrated in FIG. 2. In some embodiments, one or more steps illustrated in FIG. 2 may be performed sequentially in the order shown in FIG. 2, sequentially in an order other than the order shown in FIG. 2, or in parallel (e.g., concurrently). In some embodiments, one or more steps illustrated in FIG. 2 may be combined with each other.

In step 402, a user-provided password (UPP) is obtained. In some embodiments, the UPP is provided by a user as input to a computer system. The user may provide the UPP, for example, by typing the UPP on a keyboard, keypad, or touchscreen, by copying and pasting the UPP, or by any other suitable technique. In some embodiments, the computer system receives the UPP through a component (e.g., a password input field) of a user interface (e.g., a user interface of a relying app, a user interface of a standalone enabling app, etc.). The UPP may be provided by the user for use in connection with accessing a password-protected relying app or a portion thereof. The relying app may use a password-based authentication service to authentication user credentials.

If password hardening is not enabled, the UPP is returned in step 406. For example, if the user enters the UPP in a password input field of a relying app and password hardening is not enabled, the system may provide the UPP to the relying app, rather than intercepting the UPP and providing a hardened password to the relying app in lieu of the UPP.

If password hardening is enabled, the identifier of the relying app is determined in step 408. Any suitable technique for determining the identifier of the relying app may be used, including the techniques described herein. For example, the system may obtain or calculate the relying app's identifier using an embodiment of a method 400 for extracting and verifying a target identifier of an application, as described below in connection with FIG. 3. Alternatively, the user can manually enter the relying app's identifier (e.g., if the system fails to automatically determine the relying app's identifier). Some examples of suitable identifiers (e.g., raw identifiers, target identifiers, etc.) for relying apps are described herein.

At step 414, the system determines whether suitable entropy is available for generating a hardened password for the user. In some embodiments, the system determines that suitable entropy is available if the Entropy Interface 110 indicates that an entropy datastore associated with the user is available (e.g., in the Local Entropy Repository 112 or in the Remote Entropy Repository 120). In some embodiments, if an entropy datastore associated with the user is available in the Remote Entropy Repository 120 but not in the Local Entropy Repository 112, the Entropy Interface loads the entropy datastore into the Local Entropy Repository 112.

If suitable entropy is not available, the system may obtain an entropy source from the user in step 416. For example, the Entropy Interface 110 may prompt the user to provide (e.g., upload, select, or otherwise specify) an entropy source. As described above, the entropy source may include one or more files, including but not limited to one or more image files (e.g., personal photographs).

In step 418, the system uses the entropy source to generate an entropy datastore. For example, the Entropy Interface 110 may load raw data from the entropy source (e.g., all raw data from the entropy source) from a local storage device or from a remote storage device (e.g., a cloud-based storage device) via the Network Interface 118, convert the raw data to an entropy datastore, and store the entropy datastore within the Local Entropy Repository 112, the Remote Entropy Repository 120, or even both.

In step 420, the system obtains an application-specific secret based, at least in part, on the entropy datastore and the identifier of the relying app. Any suitable technique may be used to obtain the application-specific secret, including techniques described herein. For example, a cryptographic secure one-way function may be used to compute a hash value of a string containing the identifier of the relying app and a string token obtained from the entropy datastore. As another example, a cryptographic secure one-way function may be used to compute a hash value of a portion of the entropy datastore, where the portion of the entropy datastore is selected based on the identifier of the relying app. In embodiments where the entropy datastore is stored remotely (e.g., in the Remote Entropy Database 120), the remote device may calculate the application-specific secret based on the entropy datastore and the identifier of the relying app, and send the application-specific secret to the Private Password Hardening Module 104.

In step 422, the system generates a hardened password (HP) based on the UPP and the application-specific secret. Any suitable technique may be used to generate the HP, including techniques described herein. For example, a cryptographic secure one-way function may be used to compute a hash value of the UPP and the application-specific secret.

In some embodiments, the hash value is used as the HP. In some embodiments, the hash value is used to generate the HP in accordance with any password policies imposed by the relying application (e.g., policies relating to the length of the password, characters that cannot be included in the password, combinations of characters that must be included in the password, etc.).

In step 424, the UPP is returned. For example, if the user enters the UPP in a password input field of a relying app, the system may provide the HP to the relying app, rather than providing the UPP to the relying app.

4. Exemplary Techniques for Integrating an Enabling App with a Relying App

Some techniques for integrating an enabling app with a relying app are described in Section 4. The integration techniques described herein are provided by way of example, and are non-limiting. For clarity, some embodiments are not limited by the subject matter of Section 4.

To facilitate use of HPs in a relying app in a manner that is transparent to end users (e.g., direct use of HPs), an enabling app and a relying app may be integrated. However, the use of HPs by a relying app does not require integration of an enabling app with the relying app. For example, HPs may be used in legacy relying apps without integrating the enabling app and the legacy relying app.

Depending on the types of enabling app and relying app, the integration techniques can be quite different. The following is a list of several example integration methods.

4.1. Exemplary Techniques for Integrating an Enabling Web App 4.1.1. In-Browser Integration In-browser Integration is a type of integration adopted by a user that facilitates interoperability between an enabling web app and a relying app within an Internet browser (e.g., a web browser). In web browsers, cross-domain communication is generally well supported (e.g., the postMessage primitive).

For in-browser integration, the relying app may be a relying web app. In-browser Integration can be implemented in several ways, including but not limited to: (1) browser extension/plugin, which extends the browser in a way that introduces an enabling web app to a relying web app, (2) proxy, which modifies HTTP responses from relying web app server in a way that introduces an enabling web app to a relying web app routed through the proxy, and/or (3) server-side modification, which changes server-side code so that an enabling web app is launched after loading the (modified) relying web app in a browser. In any of the above methods, the communication channel between an enabling web app and a relying web app is cross-domain communication, which is generally supported by web browsers.

4.1.2. Cross-Browser Integration

Cross-browser Integration is a type of integration adopted by a relying app that facilitates interoperability between an enabling web app and a relying app across the boundary of a web browser. Cross-browser integration may be used by relying native apps, which do not run within a browser. In cross-browser integration, the communication channel between an enabling web app and a relying native app is cross-browser communication (e.g., passing parameters to the URL of an enabling web app).

4.2. Exemplary Techniques for Integrating an Enabling Native App

Inter-app Integration is a type of integration adopted by a relying app that facilitates interoperability between an enabling native app and a relying app via inter-process communication channels (IPC) as supported by the underlying OS.

For inter-app integration, the relying app may be a relying native app. The communication channel between an enabling native app and a relying native app may be referred to herein as "Inter-app Communication".

4.3. Exemplary Techniques for Integrating an Enabling Service

In-context Integration is a type of integration adopted by a user that facilitates interoperability between an enabling service and a relying possible via OS supported services or extensions, which allow an enabling service to run within the context of a relying app (e.g., a relying web app or a relying native app).

The communication channel between an enabling service and a relying app may be referred to herein as "In-context Communication", which may be tied to some well-scoped area of the OS, for example, custom IME.

4.4. Summary

In general, integration adopted by user may be preferable for working with legacy relying apps, and integration adopted by relying app may be preferred for mass adoption.

5. Exemplary Embodiments of Some Components of a Security System

Some non-limiting embodiments of components of the security system 101 are described in Section 5. For clarity, some embodiments are not limited by the subject matter of Section 5.

5.1. Instrumentation Unit (102)

In some embodiments, the Instrumentation Unit 102 facilitates the interoperability between a relying app and an enabling app, thereby making the (direct) use of HPs in a relying app transparent to the end user. In some embodiments (e.g., for standalone enabling apps), the Instrumentation Unit is not used.

5.2. Private Password Hardening Module (104)

In some embodiments, the PPHM 104 includes a set of logically related components working together to generate HPs with or without involving remote components (e.g., the Remote Entropy Repository 120 or the Configuration Authority 122).

For a standalone enabling app, the components within PPHM may run in the same app (enabling app). Otherwise, for enabling apps integrated with relying apps, these components may not necessarily run in the same app. Rather, the locations of these components may depend on the actual integration technique.

5.3. Communication Channel (106)

In some embodiments, the Communication Channel 106 is a facility that enables information exchange between an enabling app and a relying app within the same client device.

5.4. Application Detector (108)

In some embodiments, the Application Detector 108 extracts and verifies raw identifiers and target identifiers of relying apps (e.g., running relying apps). In some embodiments, the application detector 108 provides a trusted target identifier to the (local) entropy repository.

Figure 3:
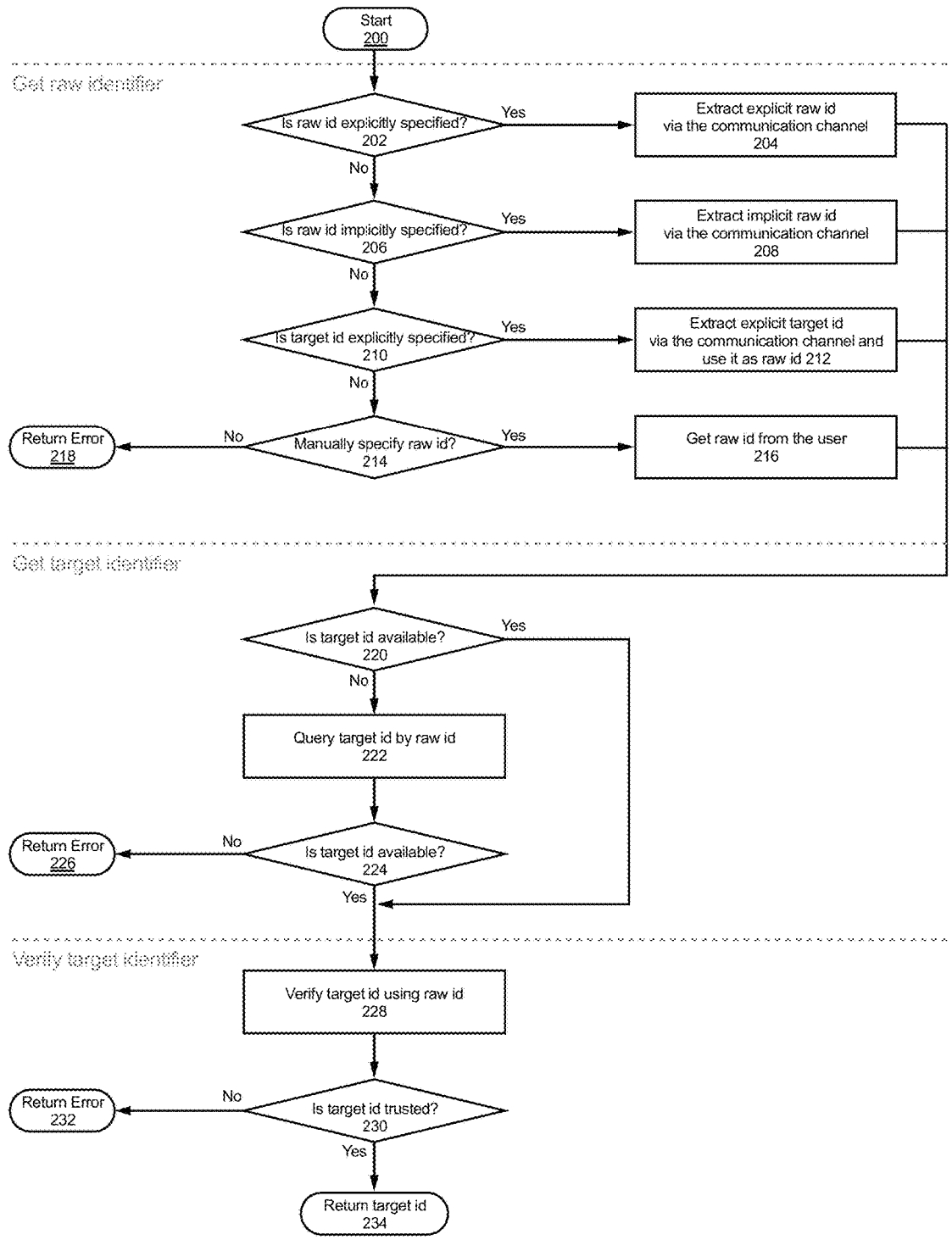
FIG. 3 is a flowchart illustrating a method of extracting and verifying a target identifier of an application, according to some embodiments.

FIG. 3 shows a method 200 of extracting and verifying a target identifier of an application, according to some embodiments. In some embodiments, the method 200 includes three stages: obtaining a raw identifier (steps 202-218), obtaining a target identifier (steps 220-226), and verifying the target identifier (steps 228-234).

5.4.1. Exemplary Techniques for Obtaining a Raw Identifier (Steps 202-218)

At step 202, the application detector 108 determines whether a raw identifier is explicitly specified (e.g., via a parameter passed through the communication channel). For example, the raw identifier may be specified via a parameter to postMessage as in an in-browser channel, or as a URL query parameter in a cross-browser channel. In some embodiments, a raw identifier may be manually specified in standalone enabling apps.

If a raw identifier ("raw ID") is explicitly specified, the application detector 108 extracts the raw ID in step 204. Otherwise, in step 206, the application detector 108 determines whether a raw identifier is implicitly specified via the communication channel. For example, MessageEvent.origin can be used as a raw identifier.

If a raw identifier is implicitly specified, the application detector 108 extracts the raw ID in step 208. Otherwise, at step 210, the application detector 108 determines whether a target identifier ("target ID") is explicitly specified through the communication channel.

If a target identifier is explicitly specified, to the application detector 108 extracts the target identifier for use as a raw identifier in step 212. Otherwise, in step 214, the application detector 108 prompts the user to manually specify a raw identifier. The application detector 108 then receives the user specified value in step 216 for use as a raw identifier and continue to step 220. If no user-specified value is received, the application detector 108 returns an error in step 218.

5.4.2. Exemplary Techniques for Obtaining a Target Identifier (Steps 220-226)

At step 220, the application detector 108 determines whether a target ID is available (e.g., from step 210).

If a target ID is available, the application detector 108 proceeds to step 228 to verify the target identifier. Otherwise, at step 222, the application detector 108 may query the target identifier by raw identifier. There are several ways to query a target identifier from a raw identifier, including but not limited to (1) querying a local cache, (2) querying a Relying Configuration Host 124, and/or (3) querying a Configuration Authority 122.

Querying a local cache: The Application Detector 108 may include a local cache mapping from raw identifiers to verified target identifiers (see also the discussion of step 234, below). Thus, in some embodiments, the application detector 108 may query the local cache to obtain the target identifier.

Querying a Relying Configuration Host 124: When queried with a raw identifier, the Relying Configuration Host may return a target identifier configured at the host.

Querying a Configuration Authority 122: When queried with a raw identifier, the Configuration Authority may return a corresponding target identifier, if found.

In some embodiments, the application detector 108 may use the raw identifier to directly generate a target identifier if possible. In some embodiments, the method of generating target identifiers from raw identifiers is consistent across the whole system. In some embodiments, the application detector generates a target identifier from a URL based raw identifier by using the origin with the domain name replaced by the main domain name. For example, the application detector 108 may use "https://example.com.fr:443" as the target identifier of raw identifier "https://mail.example.com.fr".

At step 224, the application detector 108 determines whether the target identifier is available. If not, the application detector 108 returns an error at step 226. If the target identifier is available, the application detector 108 proceeds to step 228 to verify the target identifier.

5.4.3. Exemplary Techniques for Verifying a Target Identifier (Steps 228-234)

For security purposes, it may be crucial to verify the target identifier, which may or may not be trusted depending on the source of target identifier and/or that of the raw identifier. In some embodiments, the raw identifier is verified before validating the target identifier. The following is a non-exhaustive list of methods to verify a raw identifier:

In some embodiments, a raw identifier is verified if it is trusted, (e.g., if the raw identifier is obtained from a secure (per underlying threat mode) part of the client device, for example, the browser or OS, instead of the relying app).

In some embodiments, the application detector 108 requests trusted information from the communication channel to verify the raw identifier. For example, MessageEvent.origin from an in-browser channel can be used to verify a raw identifier explicitly specified in a postMessage API.

In some embodiments, the application detector 108 prompts the user to verify a raw identifier. For example, an enabling app may prompt the user to confirm the application for which the user is generating a HP.

The following is a non-exhaustive list of methods to verify a target identifier:

In some embodiments, if the related raw identifier is not verified, then the target identifier is NOT trusted.

In some embodiments, if the target identifier is directly generated from raw identifier, then the target identifier is trusted.

In some embodiments, the application detector 108 verifies the target identifier by checking the indicated Relying Configuration Host 124. For example, the application detector 108 may check whether the remote server as indicated by the target identifier explicitly claims that the raw identifier indeed maps to the target identifier via a host-meta mechanism.

In some embodiments, the application detector verifies the target identifier by querying the Configuration Authority 122, which is trusted to determine whether the target identifier is trusted given a (trusted) raw identifier.

At step 234, the application detector 108 returns the target identifier, if it is trusted. Otherwise, an error is returned indicating the target identifier is not trusted at step 232.

5.5. Entropy Interface (110)

In some embodiments, the Entropy Interface 110 is a component of an enabling app that provides an interface to both the producer of user-provided entropy (e.g., the User 100) and consumer(s) of user-provided entropy (e.g., the Password Derivation Engine 114). For security reasons, the Entropy Interface 100 may not be part of a relying app (which can be untrustworthy).

Among other things, the Entropy Interface 110 may perform the following tasks: (1) allowing the User 100 to choose, delete, and update an entropy source; (2) to load raw data from an entropy source and convert it to an entropy datastore in a local Entropy Repository 112, or in a remote Entropy Repository 120, or in both; and/or (3) synchronizing a local Entropy Repository 112 to a remote Entropy Repository 120.

5.6. Entropy Repository (112 or 120)

In some embodiments, an Entropy Repository (112 or 120) persists normalized user-provided entropy (e.g., an entropy datastore), and uses the entropy to generate an application-specific secret for a given target identifier in an on-demand manner.

In some embodiments, an Entropy Repository (e.g., local Entropy Repository 112) resides in a client device. It is also possible, but NOT required in some embodiments, that the system engages a remote counterpart (e.g., remote Entropy Repository 120), which make the use of HPs in a new client device easier.

Figure 4:
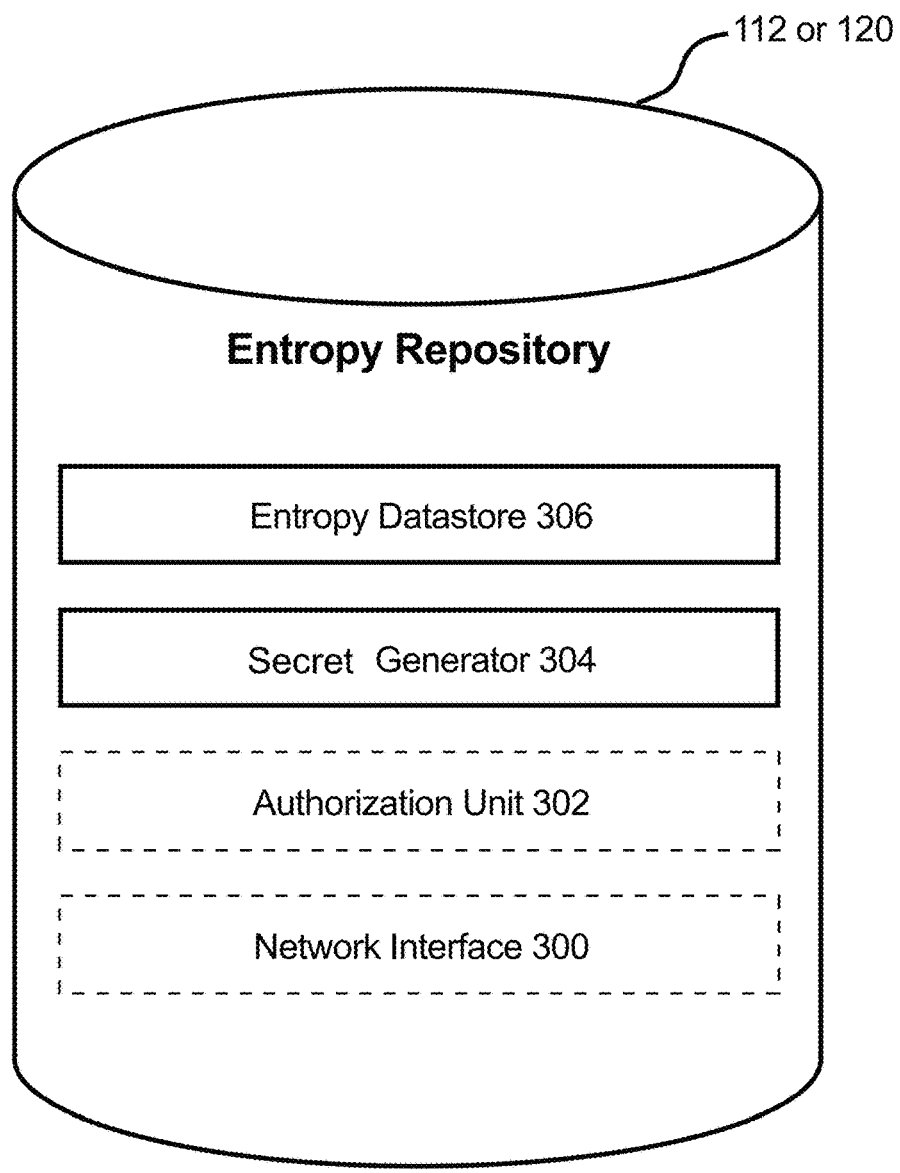
FIG. 4 is a block diagram illustrating an entropy repository, according to some embodiments.

FIG. 4 shows an Entropy Repository, according to some embodiments. In the example of FIG. 4, the Entropy Repository includes an Entropy Datastore 306 and a Secret Generator 304. In some embodiments, the Entropy Repository includes an Authorization Unit 302 and/or a Network Interface 200. In some embodiments, the Network Interface 300 is used by a remote Entropy Repository 120 to communicate with a client device running an enabling app. In some embodiments, the Authorization Unit 302 is used by a remote Entropy Repository 120 to authorize the client requesting access (read and/or write access) to sensitive entropy data. In some embodiments, the Secret Generator 304 is used by a local or remote Entropy Repository to generate an application-specific secret for a given target identifier. In some embodiments, the Entropy Datastore 306 is used by a local or a remote Entropy Repository to keep user-provided entropy in a normalized format that is used by the Secret Generator 304.

In some embodiments, an application-specific secret is generated from the Entropy Datastore 306 and a target identifier in a way such that the secret is difficult or impossible to derive without having access to the Entropy Datastore 306, and the data stored in Entropy Datastore 306 is difficult or impossible to infer from one or more secrets generated by the Secret Generator 304. For example, the Secret Generator 304 may use a cryptographic secure one-way function to compute a hash value of a string containing a target identifier and another string token obtained from the Entropy Datastore 306.

Accessing an Entropy Repository 112 or 120 may require an Authorization Unit 302 to ensure access rights. Given a target identifier, the Secret Generator 304 may generate an application-specific secret based on the Entropy Datastore 306, which may be accessible only after Authorization Unit 302 ensures the right access rights.

5.7. Password Derivation Engine 114

In some embodiments, the Password Derivation Engine 114 compute a HP based on a UPP and a policy provided by the Configuration Agent 116 (e.g., policies relating to requirements for target identifiers and/or HPs). In some embodiments, the Password Derivation Engine 114 can either run within an enabling app, or within a relying app.

For the Password Derivation Engine 114, generating a HP from a UPP may involve the following steps:
  read configurations (e.g., policies) from the Configuration Agent 116,
  request an application-specific secret from the Entropy Interface 110 (possibly via a Communication Channel 106) by specifying the target identifier read from the Configuration Agent 116,
  compute a HP based on the following inputs: a UPP, (optional) a target identifier from the Configuration Agent 116, (optional) password requirements from the Configuration Agent 116, and the application-specific secret, and
  instruct the Instrument Unit 102, if any, to provide the HP to a suitable destination (e.g., to the relying app).

In some embodiments, computing a HP from a UPP is performed in a way such that: (1) for the same UPP, the computed HP differs for a different target identifier; (2) the UPP is difficult or impossible to infer from the corresponding HP; and (3) the HP is difficult or impossible to infer from the corresponding UPP without the application-specific secret. For example, the Password Derivation Engine 114 may use a cryptographic secure one-way function to compute a hash value of a string containing a UPP and an application-specific secret requested from the Entropy Interface 110, and use the hash value to derive a HP in accordance with password requirements for the relying application. Password requirement information may be configured through the Configuration Agent 116.

5.8. Configuration Agent 116

In some embodiments, the Configuration Agent 116 provides application-specific configuration information (e.g., password policies) for a Password Derivation Engine 114 so as to generate HPs in accordance with such configuration information. The Configuration Agent 116 can either run within an enabling app, or within a relying app. When some configuration information is not readily available in a client device, the Configuration Agent 116 may consult corresponding Configuration Authority 122 or Relying Configuration Host(s) 124.

Configuration information may include but is not limited to: (1) password requirements (e.g., password length, character set, pattern, etc.), (2) target identifier, (3) (server-side, optional) raw identifier, and/or (4) (server-side, optional) allowed raw identifier(s) (e.g., a set of raw identifiers that are allowed to use the target identifier to get the same application-specific secret (given the same entropy)). In other words, in some embodiments, a group of different relying apps may share the same target identifier if and only if their trusted raw identifiers are configured as allowed raw identifier(s). Note that allowed raw identifier(s) may be server-side only configuration information (e.g., within Configuration Authority 122 or Relying Configuration Host 124, but not within Configuration Agent 116)

5.9. Network Interface 118

In some embodiments, the optional Network Interface 118 allows the PPHM to communicate with external systems. For example, when PPHM 104 does not have a local Entropy Repository 112, the Network Interface 118 can enable the Entropy Interface 110 to work with a remote Entropy Repository 120.

5.10. Configuration Authority 122

In some embodiments, the Configuration Authority 122 is a trusted entity in the system, which acts as a central configuration datastore that serves configuration information to the Configuration Agent(s) 116 running on client devices. To maintain the integrity of configuration information hosted in the Configuration Authority 122, authorization may be required to make any change to the configuration information.

5.11. Relying Configuration Host 124

In some embodiments, a Relying Configuration Host 124 is a server owned and controlled by an entity that provides a relying app, and hence can be trusted to serve configuration information for that relying app.

For example, a relying app with raw identifier "https://example.com/" may use the HTTP server as its Relying Configuration Host 124, using a configuration file (e.g., "https://example.com/meta/uhp.xml") at a well-known location that can only be accessed by the legitimate owner of the HTTP server.

In some embodiments, custom HTTP header(s) may be used to convey the same configuration information, for example, HP-Target, HP-Allow-Raw, and HP-Password-Policy.

In some embodiments, a target identifier may point to a server ("target server"), which may be owned and controlled by the same legitimate owner as the related relying apps. In some embodiments, a target server can be a Relying Configuration Host 124 serving a configuration file, which explicitly specified "allowed raw identifier(s)" so as to identify legitimately related relying app(s).

For example, a target server of https://bank.com may include https://bank.com.fr as an allowed raw identifier in its configuration file (https://bank.com/meta/uhp.xml) so that relying app hosted at https://bank.com.cn can generate HPs for https://bank.com. However, in this scenario, a potentially malicious relying app hosted at https://malicious.com cannot trick user to generate HPs for https://bank.com even if https://malicious.com/uhp.xml claims that target identifier is https://bank.com.

6. Exemplary Password-Hardening Method in an Exemplary Integration

Figure 5:
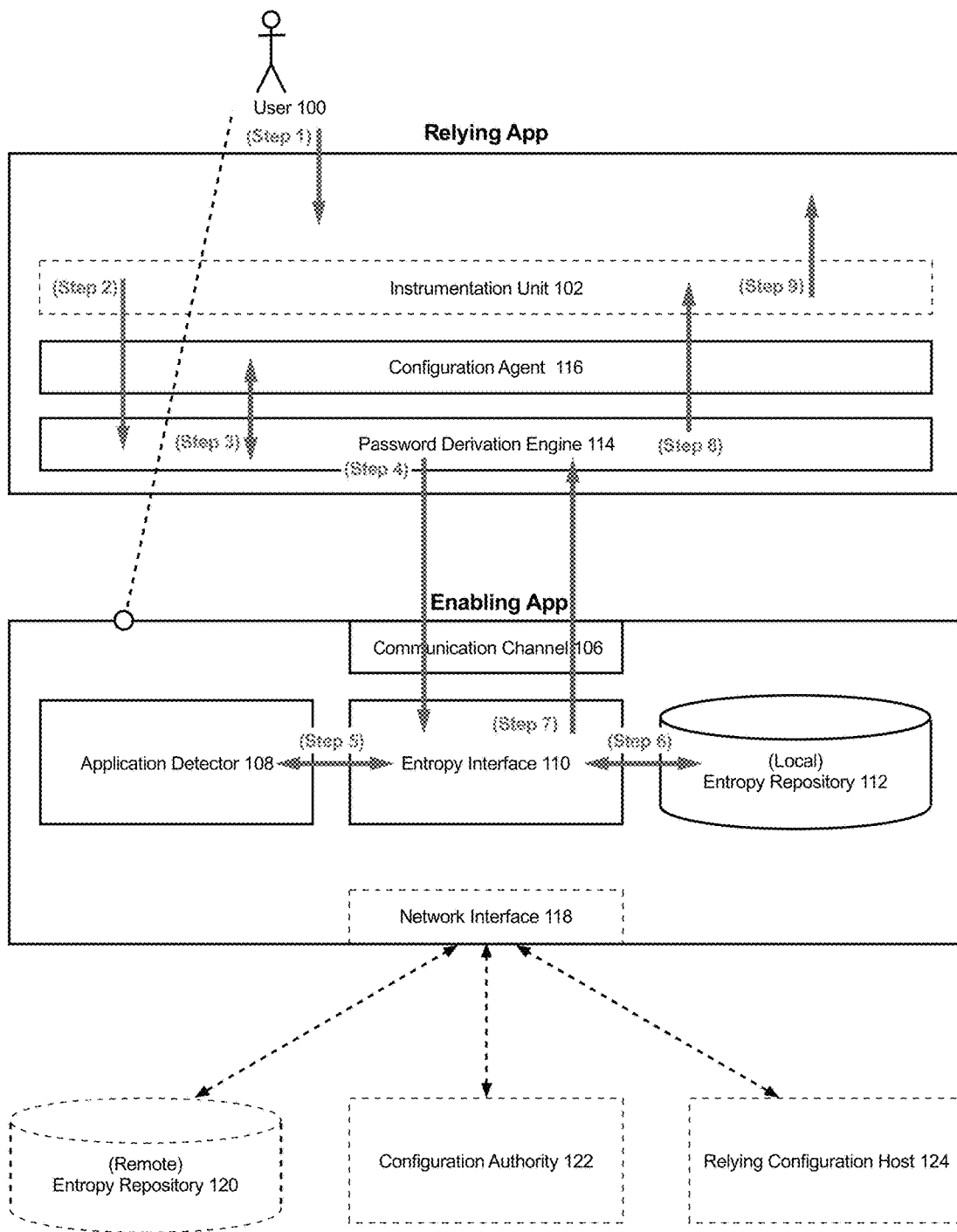
FIG. 5 illustrates steps of a method of generating a hardened password from a UPP, according to some embodiments.

FIG. 5 illustrates some steps in a sample integration, according to some embodiments. In the example of FIG. 5, the Instrumentation Unit 102, Password Derivation Engine 114, and Configuration Agent 116 are contained in a relying app, and user-provided entropy is loaded to the local Entropy Repository 112. In the non-limiting example of FIG. 5:

Step 1: User 100 types a password (UPP) in a password field;

Step 2: Instrumentation Unit 102 notifies Password Derivation Engine 114 to generate a HP;

Step 3: Password Derivation Engine 114 requests configuration information from Configuration Agent 116;

Step 4: Password Derivation Engine 114 requests the application-specific secret, which is needed to generate a HP, from Entropy Interface 110 via Communication Channel 106;

Step 5: Entropy Interface 110 asks Application Detector 108 for a trusted target identifier (see also FIG. 3);

Step 6: With a trusted target identifier, Entropy Interface 110 requests the secret on behalf of the relying app;

Step 7: Entropy Interface 110 sends the application-specific secret obtained from Entropy Repository 112 back to Password Derivation Engine 114 in the relying app via the Communication Channel 106;

Step 8: Password Derivation Engine 114 computes a HP based on UPP, an application-specific secret obtained from the enabling app, and the configuration from Configuration Agent 116. Then, it notifies Instrumentation Unit 102 with the HP;

Step 9: Instrumentation Unit 102 then instructs the relying app to proceed with the generated HP instead of the original UPP.

FURTHER DESCRIPTION OF SOME EMBODIMENTS

Some embodiments of the systems and methods described herein may be beneficially applied to enhance the security of systems that use password-based authentication. In some cases, such beneficial use of the systems and methods described herein can be achieved in a manner that is completely transparent to users of the password-protect system. For example, a provider of an existing password-protected service or an operator of an existing password-protected system may configure a password-hardening tool to intercept users' existing user-provided passwords and generate hardened passwords. (In such implementations, the service provider or system operator may provide the entropy source for each user.) The service provider or system operator can then replace the users' existing passwords with the hardened passwords, and configure the password-hardening tool to substitute hardened passwords for user-provided passwords when the user requests authentication in the future.

As another example, service providers and system operators often require users to change their passwords from time to time (e.g., once every two to three months). The purpose of such password-rotation policies is to enhance security by changing any compromised passwords or by changing passwords before they become compromised. However, such policies can increase the cognitive burden on users, who may respond by using very simple, easy-to-remember, and easy-to-guess passwords. Thus, such policies can, in some cases, have a negative impact on security. Using embodiments of the systems and methods described herein, a service provider or system operator can rotate users' hardened passwords transparently, without burdening the user, simply by changing the users' entropy sources.

Password-based authentication systems and methods have been described. In some embodiments, password-based authentication systems, tools, methods, interfaces, and/or portions thereof, (e.g., system components, method steps, interface operations, etc.) may be implemented using one or more computers. In some embodiments, password hardening systems, tools, methods, interfaces, and/or portions thereof, (e.g., system components, method steps, interface operations, etc.) may be implemented using one or more computers.

Such computers can be implemented in digital electronic circuitry, or in computer software, firmware, and/or hardware, including the structures disclosed herein and their structural equivalents, or in combinations of one or more of them. Portions of the subject matter described in this disclosure can be implemented as one or more computer programs, i.e., one or more modules of computer program instructions, encoded on a computer storage medium for execution by, or to control the operation of, data processing apparatus.

Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some embodiments of the methods, steps, and tools described in the present disclosure can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, for example web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some embodiments of the processes and logic flows described in this disclosure can be performed by one or more programmable processors executing one or more computer programs to perform actions by operating on input data and generating output. Some embodiments of the processes and logic flows described herein can be performed by, and some embodiments of the apparatus described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Figure 6:
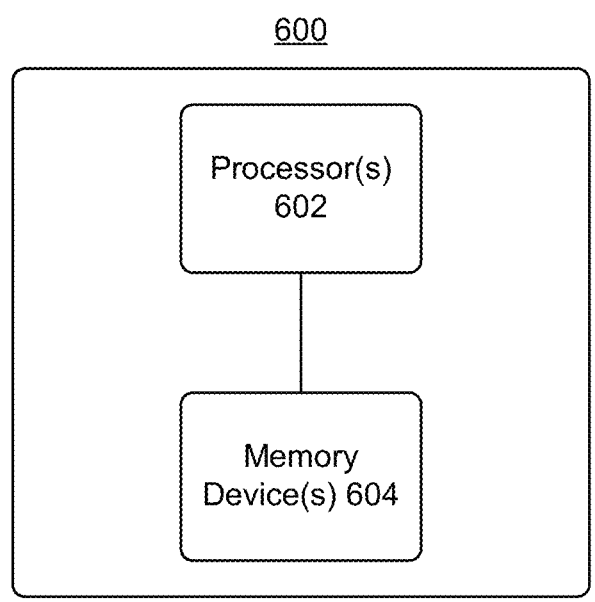
FIG. 6 is a block diagram illustrating a computer system suitable for practicing some embodiments.

FIG. 6 shows a block diagram of a computer 600. The elements of the computer 600 include one or more processors 602 for performing actions in accordance with instructions and one or more memory devices 604 for storing instructions and data. In some embodiments, one or more programs executing on one or more computers 600 can control the computer(s) to perform the methods described herein and/or to implement the systems described herein. Different versions of the program(s) executed by the computer(s) 500 may be stored, distributed, or installed. Some versions of the software may implement only some embodiments of the methods described herein.

Generally, a computer 500 will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Some embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this disclosure contains many specific implementation details, these should not be construed as limitations on the scope of any inventions or of what may be claimed, but rather as descriptions of features specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations may be described in this disclosure or depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Terminology

The phraseology and terminology used herein is for the purpose of description and should not be regarded as limiting.

The terms "approximately" or "substantially", the phrases "approximately equal to" or "substantially equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

EQUIVALENTS

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A password hardening method, comprising:
   receiving, at a first user device, input provided by a user, wherein the user-provided input includes a first user-provided password provided by the user for accessing an application, and wherein at least a portion of the application is protected by a password-based authentication service;
   generating a second hardened password for the user to access the application, wherein the hardened password is different from the first password and is generated by applying a first hash function to input data that includes:
   (1) the first user-provided password,
   (2) an application identifier that uniquely identifies the application, and
   (3) a cryptographic hashed data set that was generated by applying a second hash function on a user-selected image stored on the first user device; and
   providing the second hardened password to the password-based authentication service for accessing the password-protected portion of the application, wherein the authentication service grants the user access to the password-protected portion of the application based, at least in part, on the second hardened password; and
   detecting a system-issued request to change the first user-provided password; and
   responsive to detecting the predefined event, changing the second hardened password without requiring the user to modify the first user-provided password, which includes:
   replacing the user-selected image with a second user-selected file;
   generating a different hardened password based, at least in part, on the first user-provided password, the application identifier, and a portion of the second user-selected file; and
   providing the different hardened password to the password-based authentication service.

2. The method of claim 1, wherein the first user-provided password is provided by the user via a keyboard, keypad, or touchscreen of the first user device.

3. The method of claim 1, wherein the user-selected image is a photograph captured using the first user device.

4. The method of claim 1, wherein the application comprises a web page executing within a web browser, and wherein the application identifier that uniquely identifies the application is a uniform resource locator (URL) of the web page or a portion of the URL.

5. The method of claim 1, wherein the second hardened password is configured to authorize the user for accessing plurality of applications including the application.

6. The method of claim 5, further comprising verifying trustworthiness of the application identifier.

7. The method of claim 1, wherein the method is performed by the first user device, and wherein the cryptographic hashed data set is stored in a computer-readable storage medium of the first user device.

8. The method of claim 1, wherein the method is performed by the first user device, and wherein the cryptographic hashed data set is stored in a computer-readable storage medium of a second user device remote from the first user device.

9. The method of claim 8, wherein generating the second hardened password comprises:
   sending, to the second user device,
   (1) the first user-provided password;
   (2) an application identifier that uniquely identifies the application;
   (3) a cryptographic hashed data set that was generated by applying a second hash function on the user-selected image stored on the first user device; and
   (4) the user-identification data that uniquely identifies the user to the second user device; and
   receiving the second hardened password from the second user device.

10. The method of claim 1, wherein the first user-provided password is entered by the user into a user interface of the application, and wherein providing the second hardened password to the authentication service comprises:
    intercepting data representing the first user-provided password;
    replacing the data representing the first user-provided password with data representing the second hardened password; and
    sending the data representing the second hardened password to the authentication service.

11. A password hardening system, comprising:
    one or more computers programmed to perform operations including:
    receiving, at a first user device, input provided by a user, wherein the user-provided input includes a first user-provided password provided by the user for accessing an application, and wherein at least a portion of the application is protected by a password-based authentication service;
    generating a second hardened password for the user to access the application, wherein the hardened password is different from the first password and is generated by applying a first hash function to input data that includes:
    (1) the first user-provided password,
    (2) an application identifier that uniquely identifies the application, and
    (3) a cryptographic hashed data set that was generated by applying a second hash function on a user-selected image stored on the first user device; and
    providing the second hardened password to the password-based authentication service for accessing the password-protected portion of the application, wherein the authentication service grants the user access to the password-protected portion of the application based, at least in part, on the second hardened password; and
    detecting a system-issued request to change the first user-provided password; and
    responsive to detecting the predefined event, changing the second hardened password without requiring the user to modify the first user-provided password, which includes:
    replacing the user-selected image with a second user-selected file;
    generating a different hardened password based, at least in part, on the first user-provided password, the application identifier, and a portion of the second user-selected file; and
    providing the different hardened password to the password-based authentication service.

12. The method of claim 1, further comprising:
obtaining an entropy source; and
creating the entropy datastore from the entropy source;
wherein the first user-provided password is provided by the user via a keyboard, keypad, or touchscreen of the first user device.

13. The method of claim 12, wherein the first user-provided password is provided by the user via a keyboard, keypad, or touchscreen of the first user device.

14. The method of claim 1, wherein the first user-provided password is provided by the user for at least two different applications,
wherein, for each of the at least two different applications, a respective second hardened password is generated from respective input data including the first user-provided password, a respective application identifier, and at least a portion of a respective user-selected image, and
wherein the hardened passwords generated for the different applications are different from each other.

15. The system of claim 11, wherein the first user-provided password is provided by the user for at least two different applications,
wherein, for each of the at least two different applications, a respective second hardened password is generated from respective input data including the first user-provided password, a respective application identifier, and at least a portion of a respective user-selected image, and
wherein the hardened passwords generated for the different applications are different from each other.

* * * * *